United States Patent [19]

Pickering

[11] 4,166,431
[45] Sep. 4, 1979

[54] RESERVOIRS FOR LIQUIDS
[75] Inventor: John F. Pickering, Solihull, England
[73] Assignee: Girling Limited, Birmingham, England
[21] Appl. No.: 801,902
[22] Filed: May 31, 1977
[30] Foreign Application Priority Data Jun. 24, 1976 [GB] United Kingdom ............... 26255/76

[51] Int. Cl.$^2$ ...................... B65D 25/56; G01F 23/02
[52] U.S. Cl. ...................................... 116/227; 60/534;
60/585; 73/323; 220/82 R
[58] Field of Search ................. 60/592, 585, 534, 588;
184/96, 97; 73/331, 334, 323, 327, 330; 116/118
R; 220/82 R, 86 R; 188/1 A, 152, 352; 429/91,
90

[56] References Cited

U.S. PATENT DOCUMENTS

| 773,154 | 10/1904 | McFerran | 220/82 R |
|---|---|---|---|
| 2,550,152 | 4/1951 | Kennedy | 116/118 R |
| 2,554,557 | 5/1951 | Brown et al. | 73/327 |
| 2,765,661 | 10/1956 | Thomas | 73/334 |
| 3,017,987 | 1/1962 | Moslo | 220/82 R |
| 3,096,648 | 7/1963 | Dombeck et al. | 73/327 |
| 3,203,579 | 8/1965 | Reynolds | 220/82 R |
| 3,215,304 | 11/1965 | Rohe | 220/22 X |
| 3,405,525 | 10/1968 | Thomas | 60/534 |
| 3,432,380 | 3/1969 | Weber | 220/82 R |
| 3,543,581 | 12/1970 | Ryder | 73/327 |
| 3,989,056 | 11/1976 | Reinartz | 60/585 |

FOREIGN PATENT DOCUMENTS

| 679269 | 2/1964 | Canada | 220/82 R |
|---|---|---|---|
| 800942 | 12/1950 | Fed. Rep. of Germany | 60/585 |
| 2210247 | 9/1973 | Fed. Rep. of Germany | 220/82 A |
| 285293 | 2/1928 | United Kingdom | 429/91 |
| 752384 | 7/1956 | United Kingdom | 220/82 R |

Primary Examiner—Allan N. Shoap
Attorney, Agent, or Firm—Scrivener, Parker, Scrivener & Clarke

[57] ABSTRACT

In a reservoir comprising a container for liquid at least one portion of the top wall of the container is depressed to form a window, the depressed portion and at least a part of the surrounding area being transparent or translucent so that the reservoir can be filled with a liquid until the liquid is in visible contact on the under surface of the window with the surrounding part untouched.

5 Claims, 5 Drawing Figures

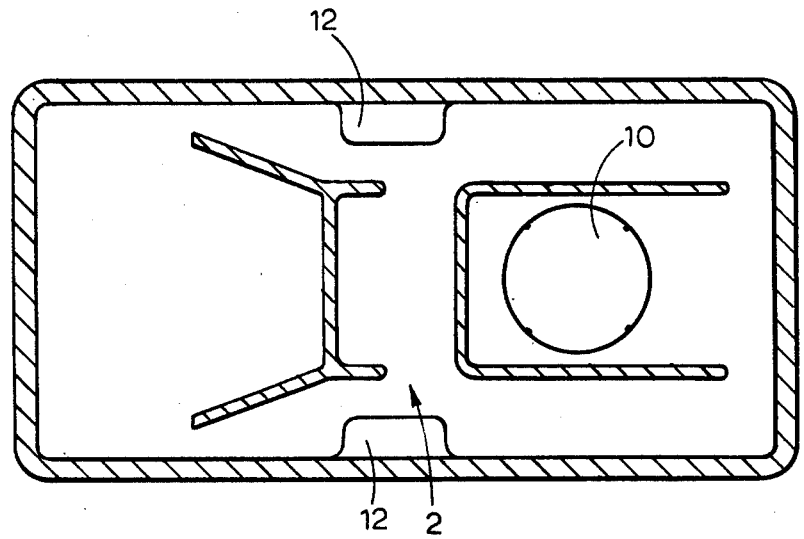
FIG. 3.
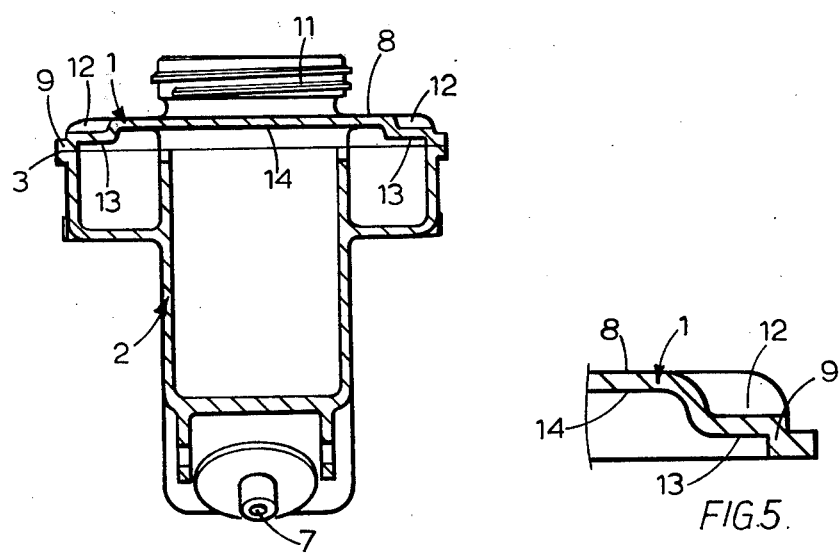
FIG. 4.
FIG. 5.

RESERVOIRS FOR LIQUIDS

SPECIFIC DESCRIPTION

This invention relates to improvements in reservoirs of the kind comprising a container for liquid of which at least a part is transparent or translucent so that the level of the liquid contents is externally visible, and the container is provided with a filler opening adapted to be closed by a detachable closure cap and through which the container can be filled with liquid.

One example of reservoir of this kind is a container for hydraulic fluid in a vehicle hydraulic system. In such a system the reservoir can be mounted directly on the body of a pedal-operated hydraulic master cylinder for a brake or clutch system. Alternatively the reservoir can be remote from the master cylinder and be connected thereto through an external connection.

It is a problem that when a reservoir of the kind set forth is filled to the brim with hydraulic fluid and then the filler opening is closed by the closure cap, when the closure cap incorporates a bulky assembly such as liquid level contents indicator, the contents indicator displaces fluid which overflows from the container. This is undesirable since conventional hydraulic fluid is highly penetrative and can remove body paint from a vehicle.

Some known reservoirs of the kind set forth include a ridge or like mark located on the transparent or translucent part of the container as an indication of the desired fluid level. However, due to the limited space considerations, when the reservoir is installed in an engine compartment sometimes the ridge or like mark is not readily visible from above, or is obscured by other engine components. Also any dirt accumulating on the ridge may give rise to misrepresentation of the true level of liquid.

According to our invention in a reservoir of the kind set forth the container comprises a continuous side wall, and a top wall incorporating the filler opening, at least one portion of the top wall being depressed to form a window, and the said one portion and at least a part of the surrounding area being transparent or translucent so that the reservoir can be filled with a liquid until the liquid is in visible contact on the under surface of the window with the said part of the surrounding area untouched by the liquid and therefore remaining unchanged in colour.

Since the window is located in the top wall it is visible from above and is unlikely to be obstructed, particularly since the reservoir must always be installed in a position which the filler opening is accessible.

As the window comprises a depression a volume normally unoccupied by liquid is defined between the undersurface of the window and the undersurface of the remainder of the top wall. Thus when the container comprises the reservoir of an hydraulic system, this volume is chosen such that it is sufficient to accommodate any hydraulic fluid which may be displaced from the container upon insertion of a liquid level contents indicator. Of course, the volume of fluid contained in the container when the fluid is in visible contact on the undersurface of the window is sufficient for the hydraulic system. Also any accumulated dirt can be readily removed from the window.

In one construction the top wall is constructed wholly of synthetic plastics material which is wholly translucent or substantially transparent and two windows are provided on opposite sides of the top wall and comprise local depressions or steps at the edges thereof. Conveniently the depressions comprise joggled portions which are formed during a moulding process to form the top wall.

The top wall can be incorporated in any of a series of containers of different capacities with the edge of the wall fixedly and sealingly secured to an exposed upper edge of a body constituted by the side wall.

One embodiment of our invention is illustrated in the accompanying drawings in which:

FIG. 3 is a section on the line 3—3 of FIG. 2;

FIG. 4 is a section on the line 4—4 of FIG. 2; and

FIG. 5 shows on an enlarged scale a portion of FIG. 4 comprising a section through one of the windows.

Figure 1:
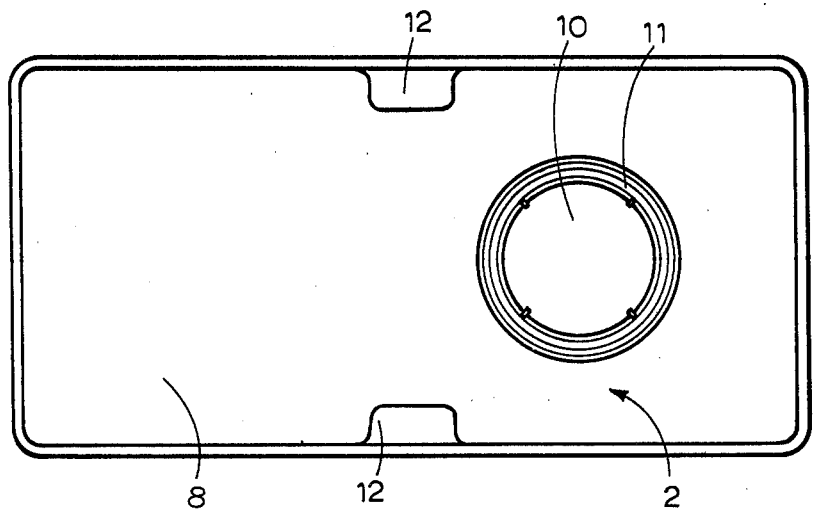
FIG. 1 is a plan view of a reservoir for an hydraulic braking system.
Figure 2:
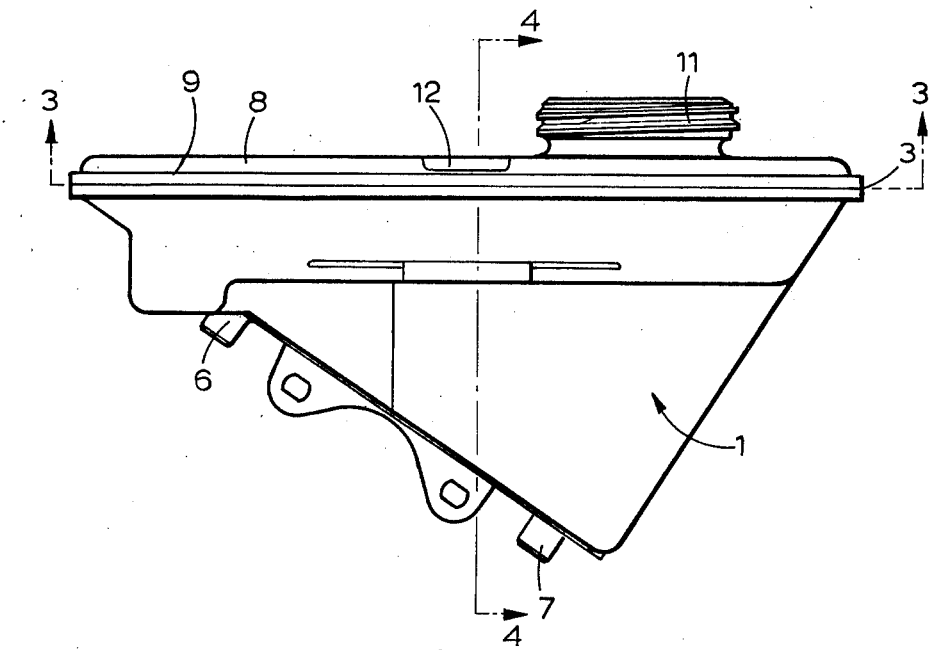
FIG. 2 is a side elevation of the same.

The reservoir illustrated in the drawings comprises a container constituted by an open-topped body 1 which is closed at its open upper end by a top wall 2. Both the body 1 and the top wall 2 comprise mouldings of synthetic plastics material which are rigidly connected together in a sealing manner by a weld or suitable adhesive to form a seam 3. The mouldings are both substantially transparent or translucent.

The body 1 is of known construction and is provided with a series of baffles which divide it into two main compartments 4, 5 for connection through outlet ports 6 and 7 to recuperation ports in the body of a master cylinder on which the reservoir is mounted.

The top wall 2 has a generally planar closure portion 8 having a short integral peripheral outwardly stepped rim or skirt 9 which is superimposed upon and connected to the exposed upper edge of the body 1. Also the top wall 2 is formed with downwardly depending local baffle portions 2a which are superimposed on and connected to the free upper edges of upstanding complementary baffle portions 1a provided in the body 1. A filler opening 10 surrounded by a threaded upstanding skirt 11 to receive a detachable closure cap leads into the compartment 5.

In accordance with our invention the top wall 2 is provided with a pair of identical windows 12. Each window 12 is located at substantially the mid-point in the length of each side edge of the top wall and comprises a local depression or joggle in the closure portion 8 which extends into the rim 9 to a position slightly above the step. Thus the lower inner surfaces 13 of the windows 12 lie in a common plane parallel with but spaced below a plane containing the remainder of the inner surface 14 of the closure portion 8.

When the reservoir is filled with hydraulic fluid through the filler opening 10 the windows 12 are clearly visible from above the container and, as the level of fluid rises, the surfaces 13 will be contacted by the fluid when a predetermined liquid level is reached. At this point the fluid, which may be slightly coloured, shows through the windows 12 whilst the remainder of the top wall 2 appears in the natural colour of the plastics material. At this level a sufficient volume is present for an hydraulic system, conveniently a braking system.

Should the filler opening 10 be closed by a closure cap embodying a liquid level contents indicator fluid displaced by the insertion of the contents indicator will be accommodated within the unoccupied volume between the two planes referred to above without any tendency for the fluid to overflow.

Any dirt which may accumulate on the top wall can be readily removed from the windows 12.

In another construction at least the top walls of the cells of an electrical storage battery for a vehicle ignition and other similar vehicle or other electrical circuits are of transparent or translucent material and incorporate windows as described in the preceding construction and through which the quantity of electrolyte within the cells can be inspected without first having to remove the filler caps.

I claim:

1. A reservoir for use as a container for hydraulic fluid in a vehicle hydraulic system, said container having a continuous side wall, a top wall extending over said side wall, said side wall extending downwardly from said top wall, a filler opening in said top wall through which fluid can be introduced into said container, at least one integral portion of said top wall being depressed to form a window, said one portion and at least a part of the surrounding area of said top wall being transparent or translucent, and the internal face of said window lying in a plane spaced below a plane containing the internal face of the said part of said surrounding area to define a predetermined level of fluid when fluid is introduced into said container through said filler opening, said predetermined level being indicated visually by surface contact of said fluid with said internal face of said window to cause an apparent colour change, which contrasts with said part of said surrounding area which at said predetermined level is untouched by said fluid.

2. A reservoir as claimed in claim 1, wherein said top wall is constructed wholly of synthetic plastics material which is wholly translucent or substantially transparent and two windows are provided on opposite sides of said top wall and comprise local depressions at the edges thereof.

3. A reservoir as claimed in claim 2, wherein said depressions comprise portions which are formed during a moulding process to form said top wall.

4. A reservoir as claimed in claim 2, wherein said side wall is incorporated in a body, and said top wall comprises a generally planar closure portion which is provided with an integral peripheral skirt having an outward step, and downwardly depending local baffle portions, and said side wall has free upper edges complementary to said skirt and said body is provided with upstanding baffle portions complementary to said local baffle portions, and said skirt and said local baffle portions are adapted to be superimposed upon and connected to said complementary free upper edges of said side wall and said upstanding baffle portions respectively, to define a substantially closed container divided into compartments by means of baffles formed by said interconnected baffle portions, said windows extending into said skirt to a position above said step.

5. A reservoir for use as a container for hydraulic fluid in a vehicle hydraulic system, said container having a continuous side wall, a top wall extending traversely over said side wall, said side wall extending downwardly from said top wall, a filler opening in said top wall through which fluid can be introduced into said container, and a closure cap incorporating a liquid level contents indicator adapted to close said filler opening, at least one portion of said top wall being depressed to form a window, said one portion and at least a part of the surrounding area of said top wall being transparent or translucent, and the internal face of said window lying in a plane spaced below a plane containing the internal face of said part of said surrounding area, the volume defined between said planes being sufficient to accommodate any hydraulic fluid which may be displaced upon insertion of said liquid level contents indicator, said window providing an indication of the maximum desired amount of liquid filled into the container upon said liquid coming into contact with said window during filling of said container.

* * * * *